United States Patent [19]
Philipp

[11] 3,934,367
[45] Jan. 27, 1976

[54] EXCHANGEABLE FRAME FOR TRANSPARENCIES

[76] Inventor: Otto Max Philipp, Eichenstrasse 15, D-8900 Augsburg-Haunstetten, Germany

[22] Filed: Mar. 21, 1974

[21] Appl. No.: 453,514

[30] Foreign Application Priority Data
Mar. 30, 1973 Germany............................ 2316010

[52] U.S. Cl. ................................................. 40/152
[51] Int. Cl.² ........................................... G09F 1/12
[58] Field of Search....................... 40/152, 10, 158

[56] References Cited
UNITED STATES PATENTS
3,200,527   8/1965   Clark ..................................... 40/152

FOREIGN PATENTS OR APPLICATIONS
1,283,028   12/1961   France ................................. 40/152
1,356,670   2/1964    France ................................. 40/152

Primary Examiner—Louis G. Mancene
Assistant Examiner—Wenceslao J. Contreras
Attorney, Agent, or Firm—Woodhams, Blanchard and Flynn

[57] ABSTRACT

A re-useable frame for photographic transparencies is injection-moulded in one piece and consists of top and bottom frame members joined by connecting elements which interengage with the top frame member as the frame is closed to strengthen a hinge which is formed by interengagement of pins on one frame member with bearings on the other.

6 Claims, 6 Drawing Figures

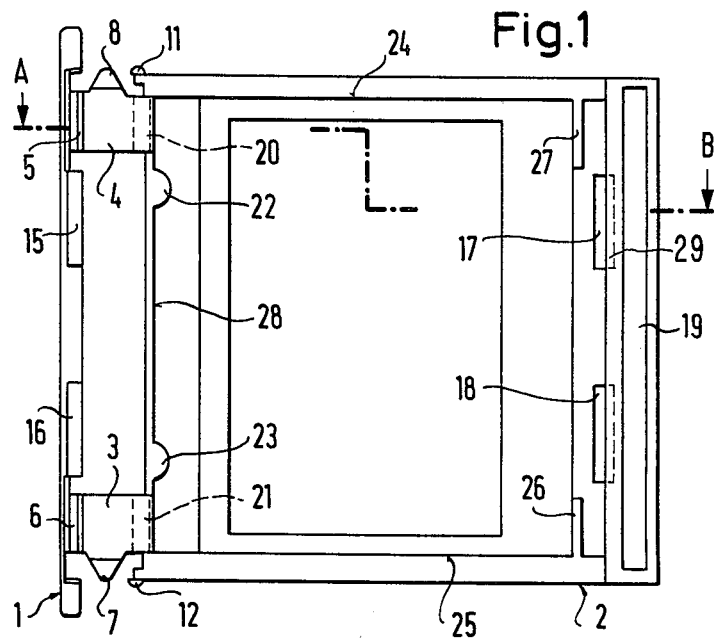
Fig. 1
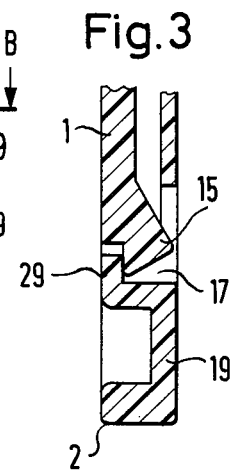
Fig. 3
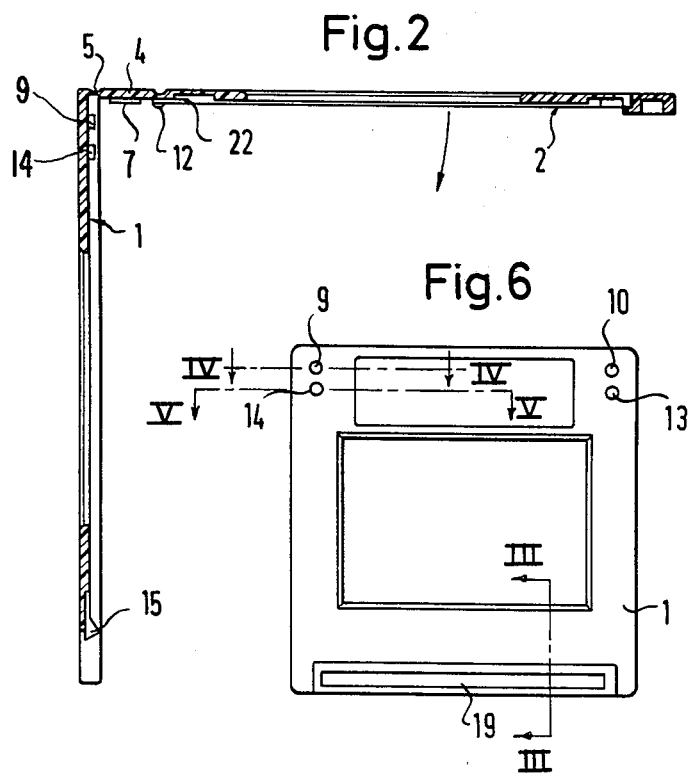
Fig. 2
Fig. 6
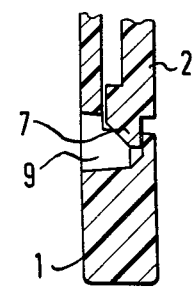
Fig. 4
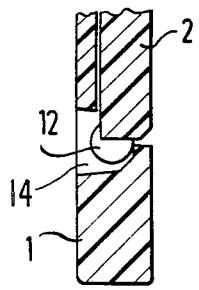
Fig. 5

3,934,367

EXCHANGEABLE FRAME FOR TRANSPARENCIES

FIELD OF THE INVENTION

The invention relates to an exchangeable frame for transparencies, having a top part and a bottom part which can be joined together by means of hinges.

BACKGROUND OF THE INVENTION

The known exchangeable frames for transparencies consist, in general, of a top part and a separate bottom part which have to be joined together, by manual work, either by the manufacturer or by the ultimate user.

The invention has set itself the task to develop an exchangeable frame mentioned at the beginning in such a manner that a joining-together of the top part and the bottom part is substantially facilitated and can, if desired, be effected automatically.

In accordance with the invention, this is achieved in that (the) top part and bottom part aare manufactured, more especially injection-moulded, from one piece and that (the) top part and bottom part are connected by one or several elements which facilitate the joining-together of the hinge.

It is particularly advantageous to design the elements as connecting plates which, after the folding-over of the top part towards the bottom part, snap into the bottom part and support the hinge locally.

Through the connection of the top part to the bottom part via the connecting plates, the relative movement between the two parts is narrowly confined to a swinging movement which, perforce, joins the hinges of the exchangeable frame together. The exchangeable frame in accordance with the invention can thus be joined together extremely rapidly and even automatically in a simple manner.

BRIEF DESCRIPTION OF THE DRAWINGS

An exemplified embodiment of the invention is now described with the aid of the drawings, in which FIG. 1 shows a top view of the exchangeable frame of the exemplified embodiment, FIG. 2 shows a sectional view, along the line A-B in FIG. 1, of the exchangeable frame in accordance with the exemplified embodiment, FIG. 3 shows a sectional view, in enlarged representation and taken along the line III—III of FIG. 6, of the locking of the folded exchangeable frame, FIG. 4 shows a 90° rotated sectional view, taken along the line IV—IV of FIG. 6, of the connecting plate, connecting top part and bottom part, in engagement with the top part of the exchangeable frame, FIG. 5 shows a 90° rotated sectional view, taken along the line V—V of FIG. 6, of the hinge-like connection between top part and bottom part, and FIG. 6 shows a top view of the closed exchangeable frame in accordance with FIG. 1.

DETAILED DESCRIPTION

The exchangeable frame of the preferred exemplified embodiment is injection-moulded in one piece from plastics material. Preferably, the top part is, in this connection, bent towards the bottom part, by way of example at 90°. This has the advantage that, on the one hand, a great number of exchangeable frames can be produced simultaneously in a multiple mould; on the other hand, the closing of the exchangeable frame is facilitated.

The top part 1 and the bottom part 2 are, as FIGS. 1 and 2 show, connected by two connecting plates 3, 4. Depressions 5, 6 and 20, 21 at the transition points between the connecting plates and the top part or respectively the bottom part define a pair of hinges 5,6 and 20,21 to facilitate the folding-in and folding-over of the top part 1 towards the bottom part 2. On their outer edges, the connecting plates 3 and 4 can possess noses 7 and 8 (compare also FIG. 4) which engage in recesses 9 and 10 (FIGS. 3 and 6) of the top part.

Detent pins or balls 11 and 12, which are fitted to the outer edges of the bottom part, are axially aligned with the depressions 20,21 and pass, upon the folding-together, into holes 13 and 14 (FIG. 6) of the top part to thereby define a pair of fastening devices 11, 13 and 12, 14.

Fitted to the edge of the top part 1 that is opposite the hinge edge between top part and bottom part are one or several, preferably two crosspieces 15, 16 which, in the folded position of the exchangeable frame, engage in recesses 17, 18. A key extending parallel to the recesses 17, 18 along the edge of the bottom part partially covers, with the projections 29, 30, the recesses 17, 18, so that the crosspieces 15, 16 are firmly held in the recesses 17 and 18 when the exchangeable frame is folded up.

When an exchangeable frame emerges from the casting mould, it is folded together either by hand or preferably automatically. In this connection, the top part 1 swings, with the connecting plates 3 and 4, about the depressions 20, 21. When the top part 1 and the bottom part 2 finally come to lie parallel to one another, then the detent pins or balls 11, 12 are pressed or snapped into the holes 13, 14 and the noses 7, 8 of the connecting plates 3, 4 are pressed or snapped into the recesses 9, 10. This operation can be facilitated in that the two edges, which are turned to one another, of the top part and of the bottom part are deflected.

By pressure on the key 19, the top part is released for the insertion of a film section. Upon opening, it swings about the detent pins or balls 11 and 12. The film section is now placed under the holding noses 22 and 23 and is limited, at the same time, by the ribs 24, 25, 26, 27 and 28 of the bottom part. Top part 1 and bottom part 2 can now easily be pressed together again, in which connection the locking snaps in again automatically through the key 19.

Preferably, the exchangeable frame is used without glasses. It then has a thickness that is comparable to the customary cardboard frames, approximately 1.8 mm.

It is unimportant whether the connection of the connecting plates to the top part or the bottom part breaks off at one or several of the depressions 5, 6 or respectively 20, 21 after the joining-together, since the hinged joint defined by the detent pins or balls 11, 12 being received in the recesses 13, 14 is then already joined together. The exchangeable frame can therefore be opened as often as it is desired. On the other hand, the connecting plates 3, 4 fix the position on the hinge structure 11, 12, 13, 14, 20, 21, so that this latter is secured against breaking open. Even in the case of a breaking-open of the hinged joint 11, 12, 13, 14 the connecting plates take over its function with their depressions 20, 21.

Even if the connecting plates 3, 4 are designed without noses 7, 8, they can, to a certain degree, fulfill the task of introducing the hinge structure 11, 12, 13, 14 and of positionally locating the aforesaid hinge structure. In lieu of the two plates 3 and 4, a continuous plate could also be used.

I claim:
1. A frame for transparencies, comprising:
   a monolithic top frame means, bottom frame means and a connecting plate means therebetween;
   first and second hinge means for permitting a relative pivoting between said connecting plate means, said bottom frame means and said top frame means;
   first fastening means for fastening said connecting plate means in a parallel relationship to said top frame means to prevent a relative pivoting between said top frame means and said connecting plate means about said first hinge means; and
   second fastening means coaxial with said second hinge means for additionally fastening said connecting plate means to said top frame means and permitting a relative pivoting between said connecting plate means and said bottom frame means whereby when said connecting plate means is fastened to said top frame means by said first and second fastening means, said connecting plate means and said top frame means will move as a unit relative to said bottom frame means about the axis of said second hinge means and
   releasable locking means for locking said top frame means in a parallel relationship to said bottom frame means, said locking means being located along an edge of said parallel connected top and bottom frame means which is parallel to said axis of said second hinge means but remote therefrom.

2. A frame according to claim 1, wherein said connecting plate means comprises a pair of laterally spaced, flat, connecting plates.

3. A frame according to claim 2, wherein said second fastening means comprises means defining a plurality of recesses in said top frame means and detent means projecting laterally of each of said connecting plates, said detent means being received in one of said recess means and defining a hinge axis coaxial with said axis of said second hinge means.

4. A frame according to claim 2, wherein said first fastening means comprises means defining a plurality of recesses in said top frame means and a nose projecting laterally of each of said connecting plates, said nose being received in one of said recess means, said recess means including means defining a lip over which said nose projects to prevent said relative pivoting between said top frame means and said each of said connecting plates.

5. A frame according to claim 1, wherein said locking means comprises a pair of elongated bars on one of said top and bottom frame means and means defining a pair of recesses on the other of said top and bottom frame means, said bars being wider than the width of the corresponding recess but being flexible to a lesser width to facilitate a movement of said bars into and out of said recesses.

6. A frame for transparencies, comprising:
   an L-shaped injected moled monolithic top frame means, bottom frame means and a connecting plate means therebetween, said connecting plate means being initially coplanar with said bottom frame and perpendicular to said top frame, said connecting plate means being connected to said top plate along one edge of a planar face thereon;
   first and second hinge means for permitting a relative pivoting between said connecting plate means, said bottom frame means and said top frame means;
   first fastening means for fastening said connecting plate means in a parallel relationship to said top frame means to prevent a relative pivoting between said top frame means and said connecting plate means about said first hinge means, said first fastening means comprising means defining a plurality of recesses in said top frame means and a nose projecting laterally of said connecting plates, said nose being received in one of said recess means, said recess means including means defining a lip over which said nose projects to prevent said relative pivoting between said top frame means and said each of said connecting plates; and
   second fastening means coaxial with said second hinge means for additionally fastening said connecting plate means to said top frame means and permitting a relative pivoting between said connecting plate means and said bottom frame means whereby when said connecting plate means is fastened to said top frame means by said first and second fastening means, said connecting plate means and said top frame means will move as a unit relative to said bottom frame means about the axis of said second hinge means, said second fastening means comprising means defining a plurality of recesses in said top frame means and detent means projecting laterally of said connecting plates, said detent means being received in one of said recess means and defining a hinge axis coaxial with said axis of said second hinge means; and
   releasable locking means for locking said top frame means in a parallel relationship to said bottom frame means, said locking means being located along an edge of said parallel connected top and bottom frame means which is parallel to said axis of said second hinge means but remote therefrom, said locking means comprising a pair of elongated bars on one of said top and bottom frame means and means defining a pair of recesses on the other of said top and bottom frame means, said bars being wider than the width of the corresponding recess but being flexible to a lesser width to facilitate a movement of said bars into and out of said recesses.

* * * * *